Figure 1:
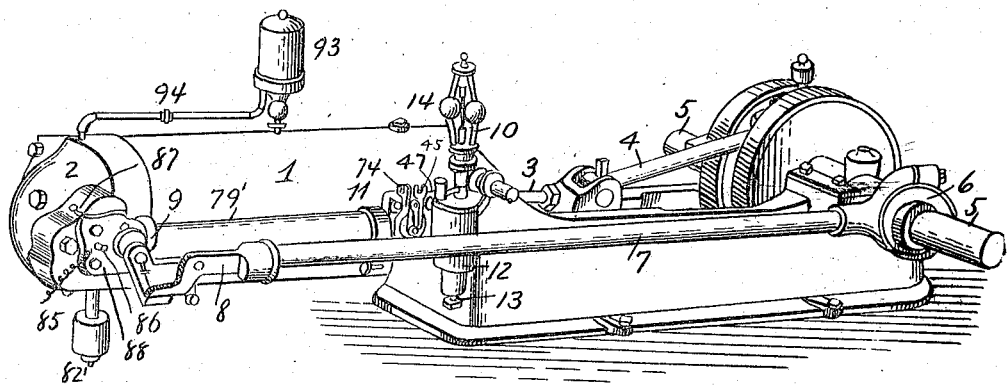

No. 881,189. PATENTED MAR. 10, 1908.
J. S. LOSCH & G. H. GERBER.
EXPLOSIVE ENGINE.
APPLICATION FILED MAY 16, 1907.

7 SHEETS—SHEET 1.

Witnesses
F. L. Currant
W. Parker Reinohl

Inventors
John S. Losch
George H. Gerber
By D. L. Reinohl
Attorney

No. 881,189.
PATENTED MAR. 10, 1908.
J. S. LOSCH & G. H. GERBER.
EXPLOSIVE ENGINE.
APPLICATION FILED MAY 16, 1907.
7 SHEETS—SHEET 2.
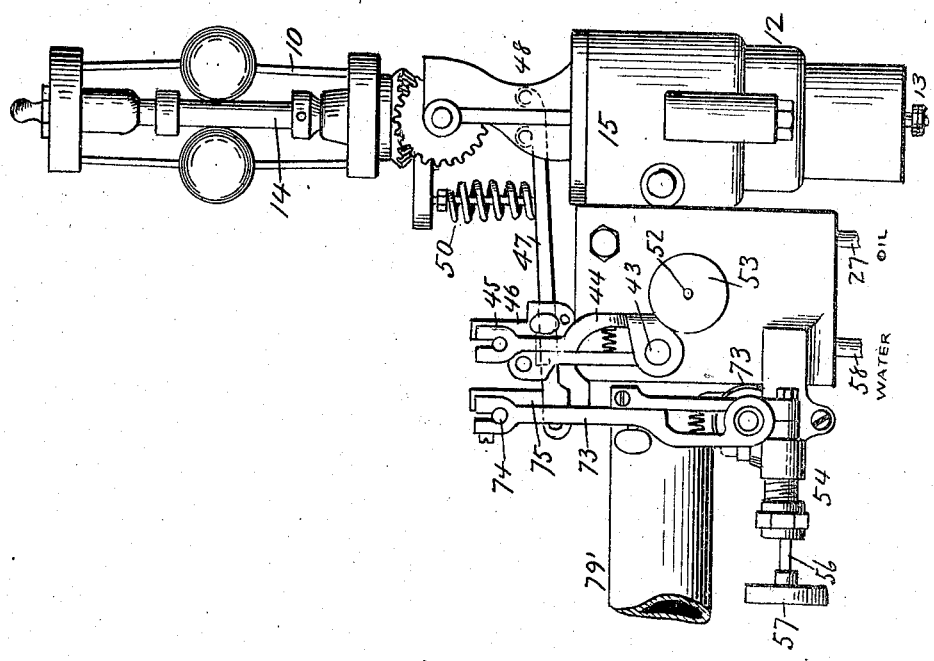
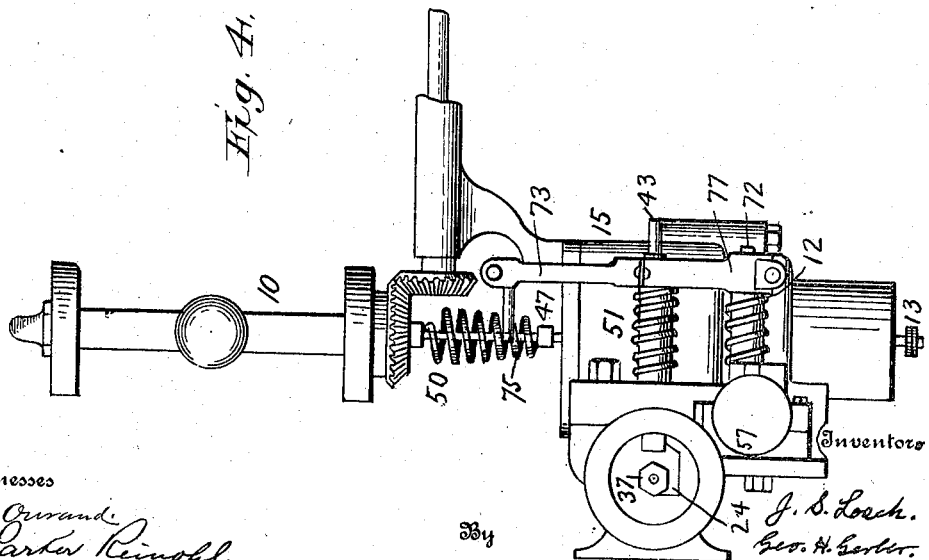

No. 881,189.  
PATENTED MAR. 10, 1908.
J. S. LOSCH & G. H. GERBER.  
EXPLOSIVE ENGINE.  
APPLICATION FILED MAY 16, 1907.
7 SHEETS—SHEET 3.
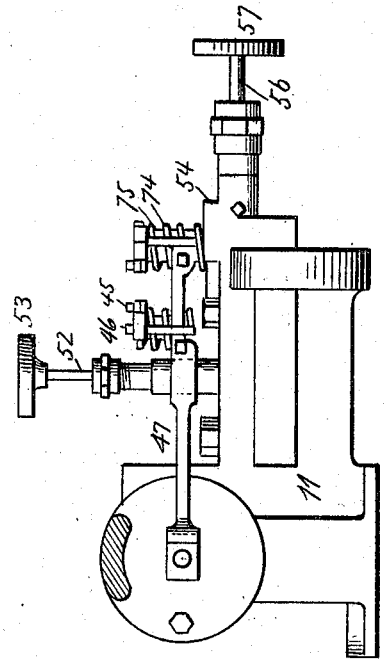
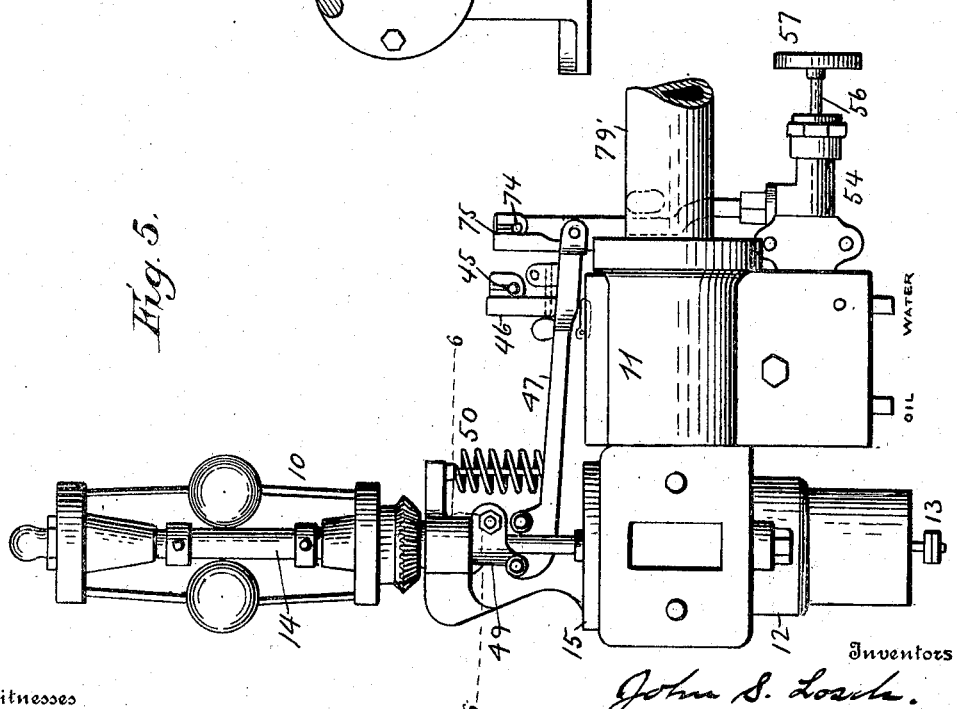
Witnesses  
F. L. Orwayd.  
W. Parker Reinohl.
Inventors  
John S. Losch.  
Geo. H. Gerber.
By D. D. Reinohl.  
Attorney

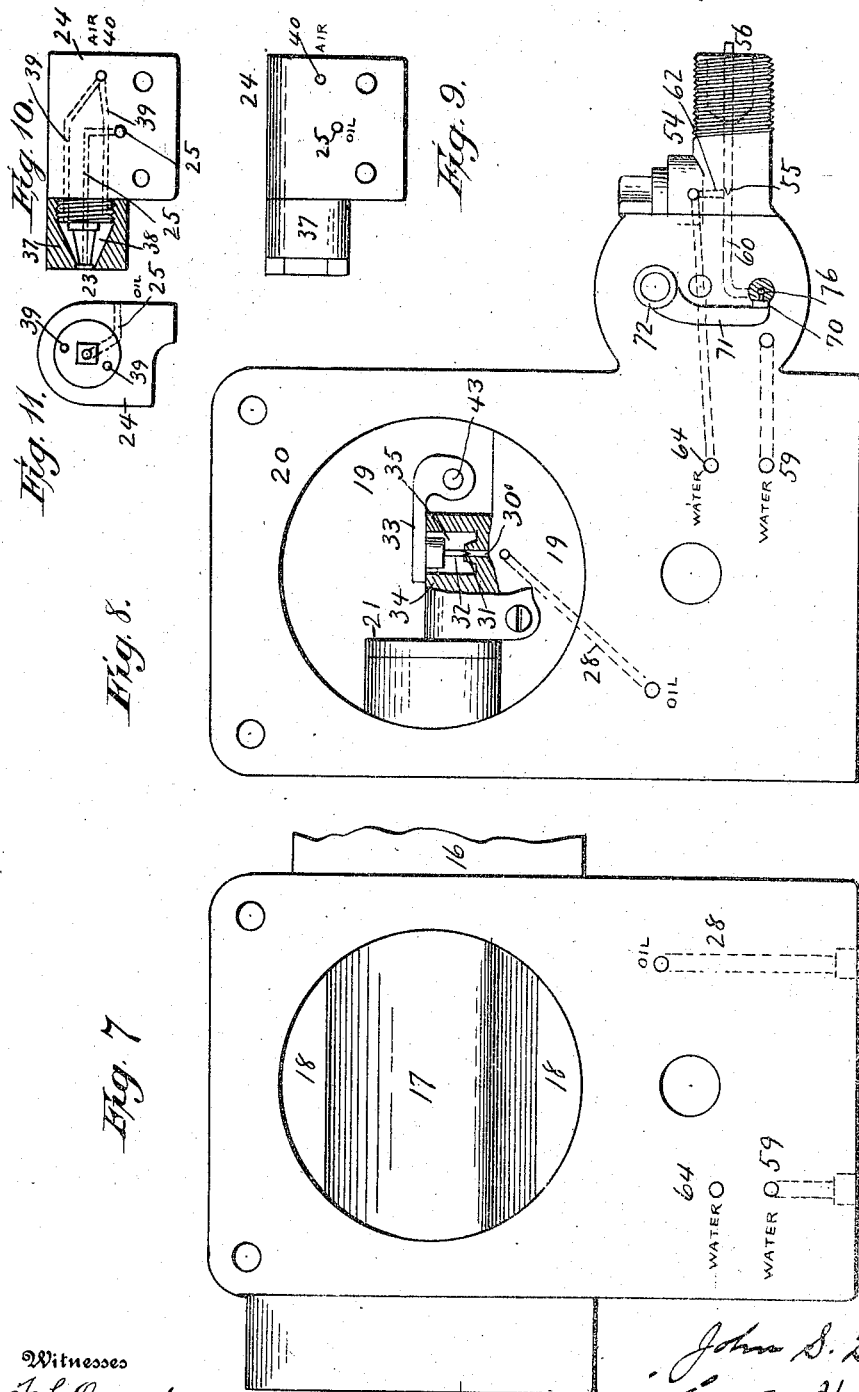

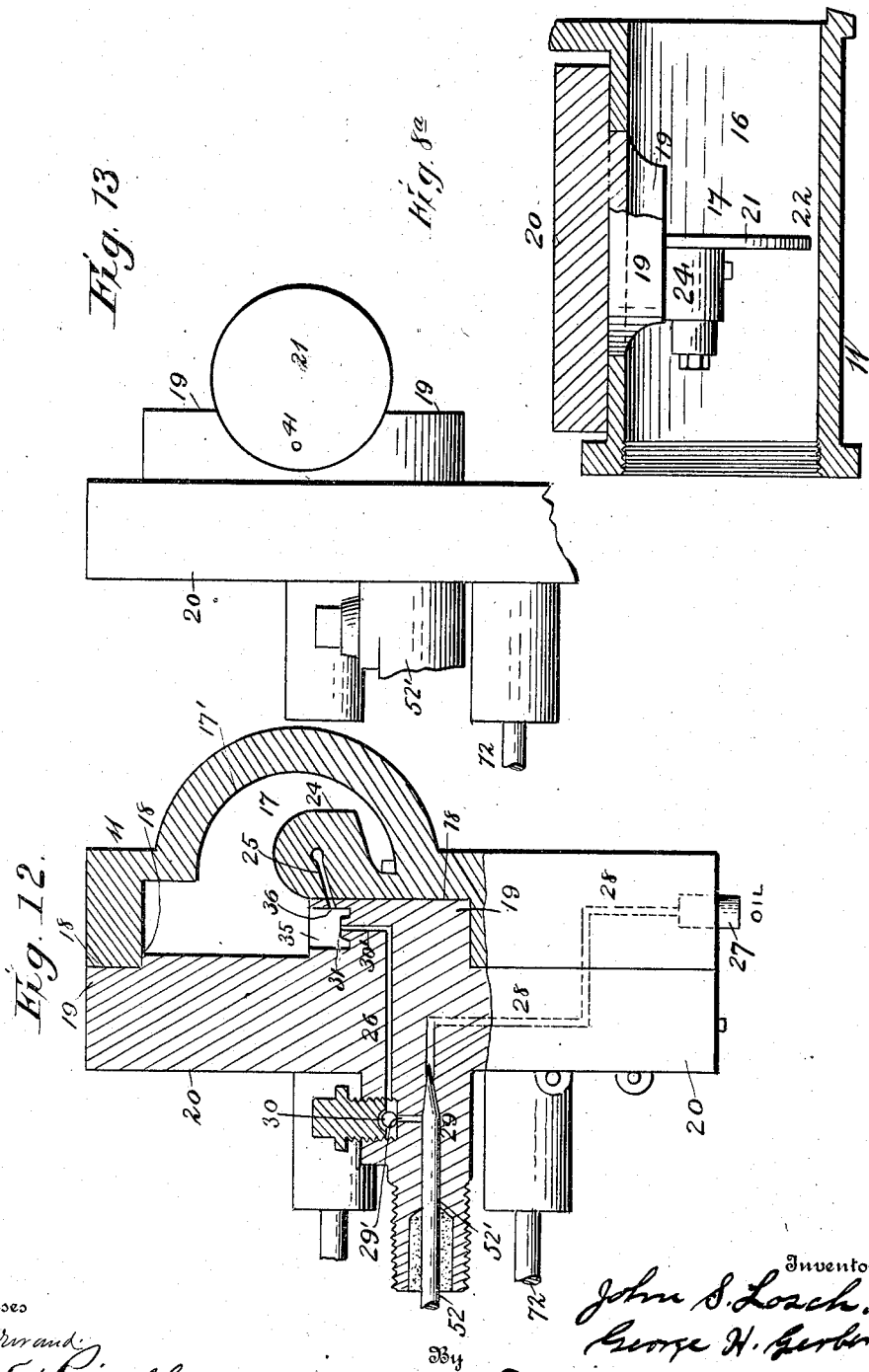

No. 881,189.
PATENTED MAR. 10, 1908.
J. S. LOSCH & G. H. GERBER.
EXPLOSIVE ENGINE.
APPLICATION FILED MAY 16, 1907.
7 SHEETS—SHEET 6.
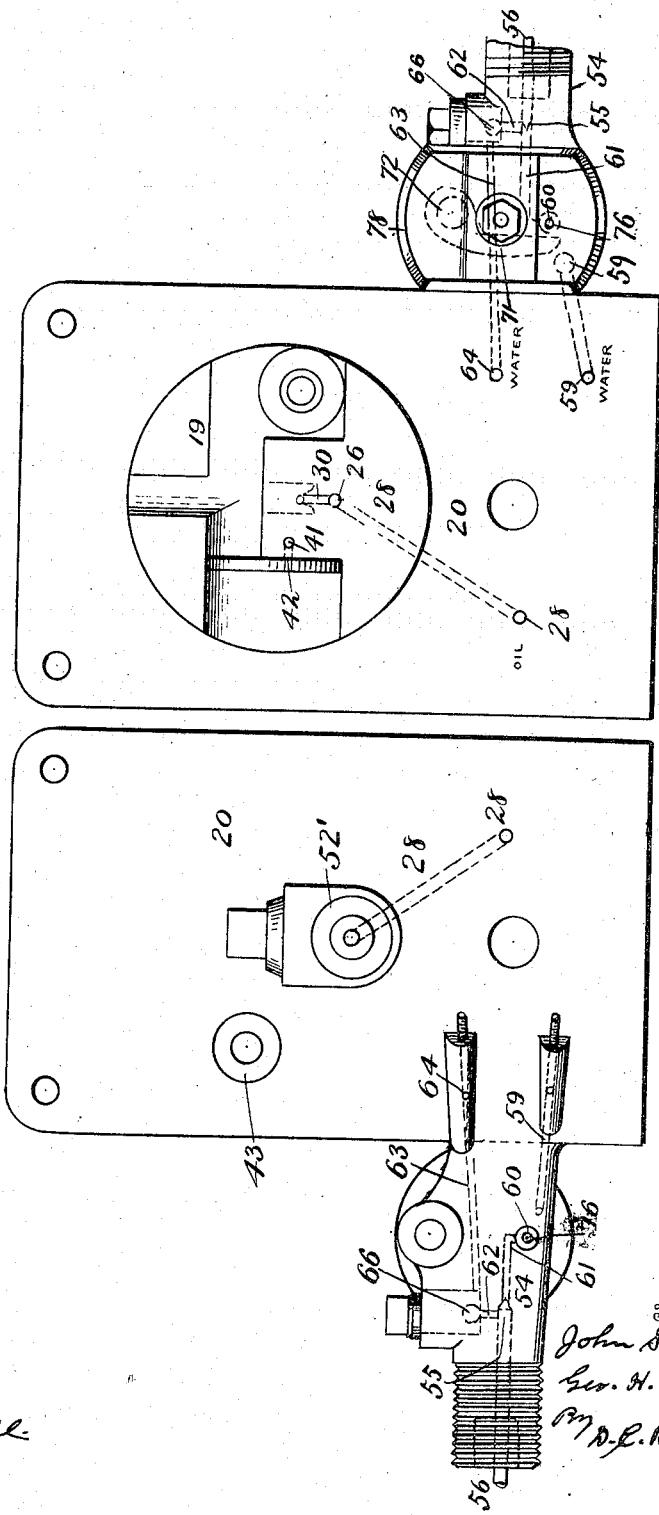

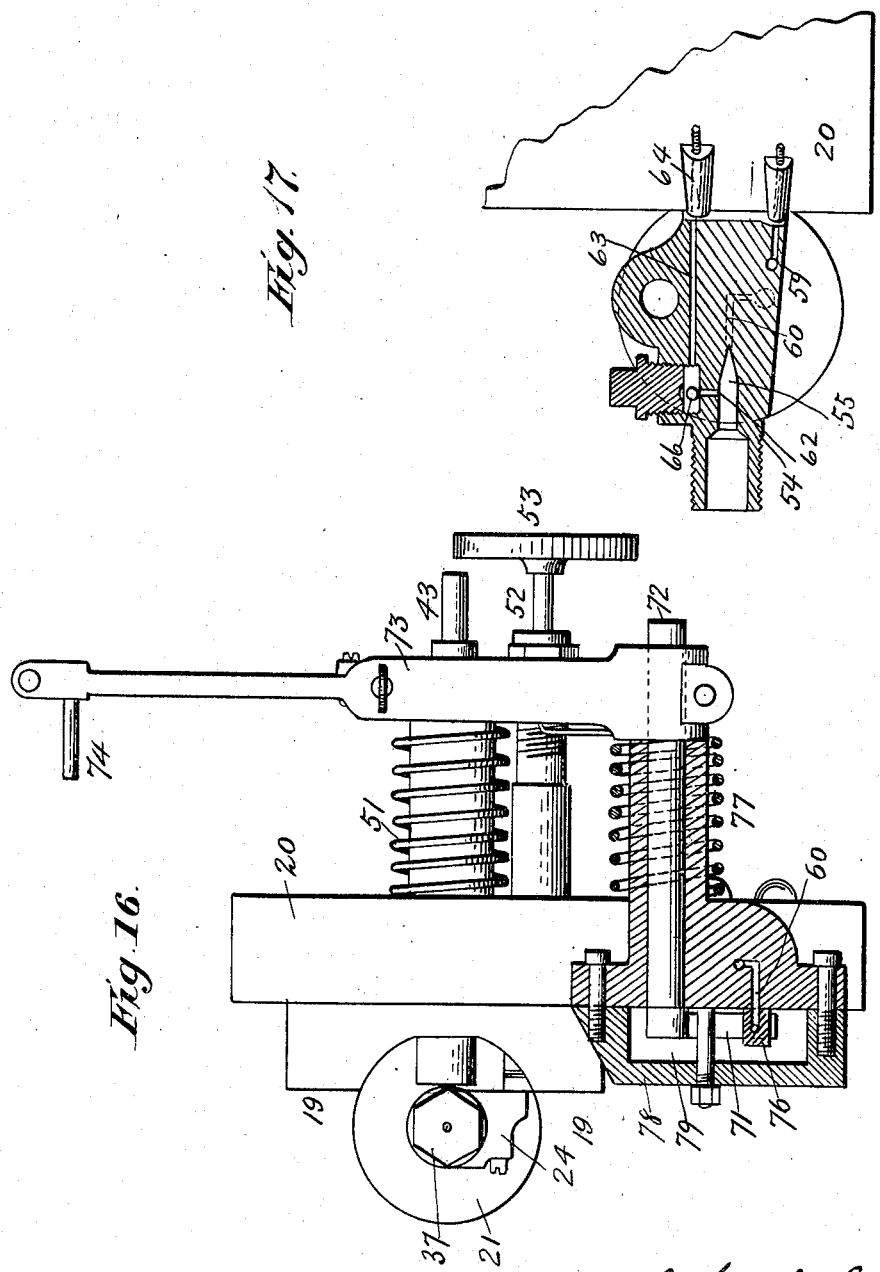

UNITED STATES PATENT OFFICE.

JOHN S. LOSCH AND GEORGE H. GERBER, OF READING, PENNSYLVANIA.

EXPLOSIVE-ENGINE.

No. 881,189.　　　　Specification of Letters Patent.　　　Patented March 10, 1908.

Application filed May 16, 1907. Serial No. 373,907.

*To all whom it may concern:*

Be it known that we, JOHN S. LOSCH and GEORGE H. GERBER, citizens of the United States, and residing at Reading, in the county of Berks and State of Pennsylvania, have invented certain new and useful Improvements in Explosive-Engines; and we do hereby declare the following to be a full, clear, and exact description of the invention, such as will enable others skilled in the art to which it appertains to make and use the same.

Our invention relates to explosive gas engines, has especial reference to the type of engine shown and described in the patent to John S. Losch, No. 775,243, bearing date of Novemeber 15th, 1904.

The invention has for its object economy in fuel and increased effectiveness in the operation of the engine, by the use of kerosene, fuel oil of commerce, distinctively so known on the market, crude petroleum oil or denatured alcohol, or fuel gas, as a substitute for gasolene or other light oil or distillate of petroleum.

A further object is to obtain the maximum of power from the charge of fuel in a cylinder of greatly reduced area, as compared with the present practice of constructing and operating explosive gas engines.

The invention consists in certain improvements by which the velocity of the air supplied to the cylinder is accelerated and the temperature of the air increased in transit, whereby the fuel oil is drawn into the gas and air mixing chamber and is comminuted and vaporized and commingled with the air to form an explosive gaseous mixture, and water is admitted to the charge of fuel in quantity proportioned to the load on the engine and controlled by the governor to maintain the proper temperature of the explosive mixture and cool the walls of the ignition and combustion chambers when they become excessively heated, to prevent premature ignition and explosion of the mixture.

In the practical operation of engines in which coal oil, or fuel oil of commerce is used, great difficulty has been encountered in getting sufficient heat to vaporize the oil; and to effect this extraneous means have been resorted to with some degree of success. It is our purpose to vaporize the oil by heat caused by friction produced by the air under pressure traveling through a contracted passage in the gas and air mixing chamber.

Figure 2:
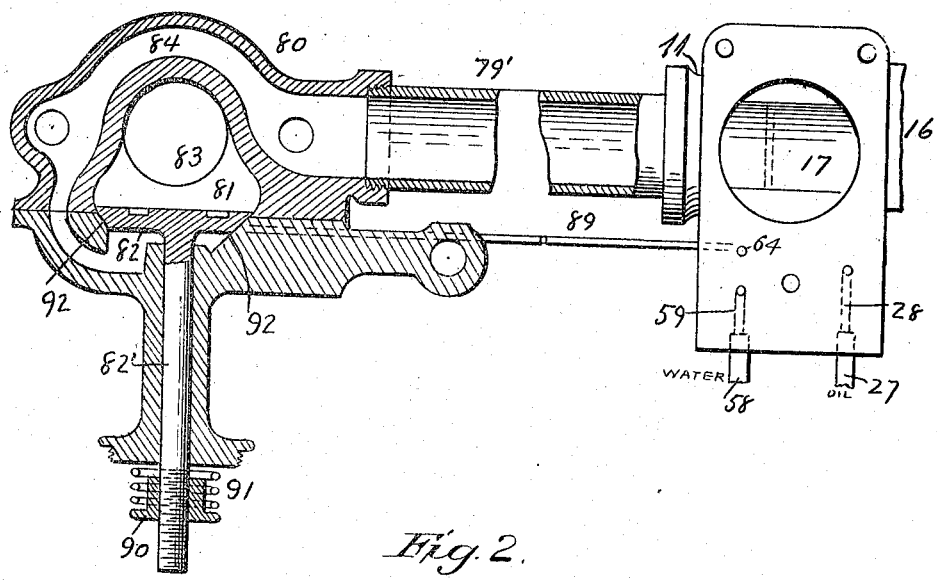

The invention will be fully disclosed in the following specification and claims:

In the accompanying drawings, which form part of this specification:—Figure 1 is a perspective of an engine embodying our invention. Fig. 2 a vertical longitudinal section of the gas or vapor supply pipe, the gas valve chamber and showing the cover of the mixing chamber removed. Fig. 3 a side elevation of the air valve chamber, the gas mixing chamber and the governor on an enlarged scale, the engine cylinder being omitted. Fig. 4 an end view of the same detached from the cylinder. Fig. 5 a rear elevation of the same. Fig. 6 a sectional plan on line 6, 6, Fig. 5. Fig. 7 an elevation of the gas mixing chamber and the seat for its cover, with the cover removed. Fig. 8 a like view of the inside of the cover for the mixing chamber, partly in section. Fig. $8^a$, a vertical longitudinal section through the gas mixing chamber, partly in side elevation. Fig. 9 a side elevation of the oil distributing valve detached. Fig. 10 a like view partly in section. Fig. 11 a front end view of the same with the cap removed. Fig. 12 a section through the gas mixing chamber, and showing the oil supply passages and the valve controlling the supply. Fig. 13 an end elevation partly in section of the cover for the gas mixing chamber. Fig. 14 an elevation of the cover of the gas mixing chamber, the oil valve and the water valve stems being removed. Fig. 15 a like view of the opposite side of said cover detached, the water chamber being shown in elevation. Fig. 16 an end elevation of the cover of the gas mixing chamber showing the water chamber in section, and Fig. 17 a detail vertical longitudinal section of the water supply valve and its passages, the needle valve being removed, and an elevation of part of the cover of the mixing chamber.

Reference being had to the drawing, and the designating characters thereon, the numeral 1 indicates the engine-cylinder; 2 a detachable head within which the explosion of the motor fluid is effected; 3 the piston-rod; 4 the connecting-rod; 5 the power shaft; 6 the eccentric; 7 the eccentric-rod; and 8 an arm connected to and reciprocated by the eccentric-rod to operate the movable electrode 9 of the electrical igniter (not shown). 10 the governor, operated by a belt (not shown) driven by the shaft 5 in the usual manner. The several parts described are of substantially the same construction as like parts in Patent #775,243 and require no further elucidation.

On the side of the cylinder 1, and near the front end thereof is secured a chest 11 containing an air supply valve (not shown) within the cylindrical portion 12, and whose stem 13 extends below the casing, and within the chest above the air supply valve, is a governor valve (not shown) and which is connected to and operated by the rod 14 of the governor. Adjacent to the governor valve case 15, and in communication therewith through passage 16, is a gas and air mixing chamber 17 having a semi-cylindrical wall 17', and is provided with seats 18, 18, on which rest projections 19, 19 extending inward from the cover 20, and from the cover projects a circular disk 21 which is less in diameter than the circle described by the wall 17' to leave a space or passage 22, as shown in Fig. 8ª, which is almost annular, between the wall 17' and the perimeter of the disk. The disk contracts the chamber 17, transversely, causes the air coming from the air compression end of the engine cylinder and heated by compression to pass through the space or passage 22 at a greatly increased velocity which produces a vacuum at the end of the distributer and operates to draw or suck the oil from the nipple 23 in the discharge end of the oil distributer 24, and at the same time increases the temperature of the air by the friction produced in the passage of the air around the disk 21, and vaporizes the oil, as will hereinafter more fully appear.

The distributer 24 is secured to one of the projections 19, see Fig. 12 and is provided with an oil passage 25 which communicates with a passage 36, extends through the center of the distributer and to which oil is supplied through pipe 27, and channel 28, and the inner end of the latter is controlled by a needle valve 29, to regulate the supply of oil from a reservoir, not shown.

20 indicates a ball valve resting on the end of the vertical passage 29'.

30' is a passage communicating with the passage 26, and leads to a valve seat 31 controlled by a needle valve 32 secured to an arm 33, and is provided with a head 34 which enters the chamber 35 above the valve seat 31 and guides the valve to its seat. Oil from chamber 35 flows through port 36, into the passage 25 in the oil distributer, from which it is discharged through nipple 23. The end of the distributer is provided with a detachable cap 37 having a chamber 38, in which air is discharged from passages 39, admitted through ports 40 and 41, and supplied through passage 42, extending through the disk 21 and supplied by the engine, through passage 16 leading from the governor valve case.

The arm 33 is secured to a rod 43 on which is an arm 44 provided with a pin 45, which is engaged by a cam 46 on the lever 47 which is pivotally secured at 48 and is operated by an arm 49 secured to the governor valve stem 14, to supply oil in proportion to the load on the engine. The lever 47 is restored to its normal position by spring 50 when the load on the engine decreases, and the needle valve 32 is held to its seat, when no oil is required, by spring 51. The stem 52 of the needle valve 29 projects through the neck 52' on the cover 20 and is provided with a hand wheel 53 for manipulating the valve.

54 indicates the water supply valve provided with a conical seat 55, see Fig. 17, controlled by a like conical or needle point valve (not shown) having a stem 56 and hand wheel 57.

58 indicates a water supply pipe from which a passage 59 leads to the water chamber 79, and from said chamber the water is conducted through port or passage 60 in post 76 and travels through passages 61 and 62, and then through passages 63 and 64 into pipe 89, as shown in Figs. 2, 7, 8, 14 and 15.

The water is controlled automatically by valve 70 on arm 71, connected to rod 72 and operated by the governor through the medium of arm 73 provided with stud or pin 74 which engages the cam 75 on the lever 47, and the valve 70 is held normally to its seat on the hollow post 76, by spring 77.

78 indicates a cap having a chamber 79 which incloses the post 76, and the arm 71, and forms a supplemental reservoir for water.

79' indicates the gas supply pipe leading from the gas mixing chamber 17 to the chest 80, in which are the gas chamber 81, controlled by a valve 82, the ignition chamber 83 and the gas passage 84, leading to the head 2 of the engine cylinder, and extending through the cover 85 are the movable electrode 9 and the fixed electrode 86.

87 and 88 indicate the binding posts respectively for the negative and positive wires to supply the electric current to the igniter.

On the stem 82' of the gas valve 82 is a nut 90, on which spring 91 rests, for regulating the admission of gas to the engine.

89 indicates the pipe for conducting water to the gas chamber 81 and is discharged through the seat 92 of the valve 82, and enters the chamber 81 with the gas and passes on with it to the ignition chamber 83 and enters the working chamber of the engine in the head 2, and thereby cools said parts of the engine to such an extent as to prevent premature or accidental ignition and explosion of the gaseous mixture, and allows the engine to be worked up to its maximum capacity.

93 indicates a water jacketed lubricator cup connected to the water jacket of the engine cylinder by a pipe 94 to heat the lubricant and cause it to flow readily.

During the instroke of the piston, air admitted through the governor valve, fills the cylinder in front of the piston, and on the outstroke is transferred through the governor valve, the mixing chamber 17 and pipe 79' to the opposite end of the cylinder behind the piston, the charge being compressed by the return stroke of the piston until the charge is ignited and the piston driven outward in the cylinder. The supply of air and oil or other fuel is controlled by the governor, in quantities proportionate to the work or load on the engine, and the oil or fuel is delivered to the mixing chamber by the suction produced by the air in passing through the contracted portion of the mixing chamber, instead of being forced in, as is the usual practice, and is thoroughly commingled with the air from the outer end of the cylinder and forms a gaseous mixture.

When the load on the engine is increased and more fuel is required, water is admitted to the gas and ignition chambers 81 and 83, controlled by the governor, to maintain the temperature at a point to prevent premature ignition of the charge.

The waste products of combustion are expelled from an exhaust port or passage, not shown, in the bottom of the cylinder.

Having thus fully described our invention, what we claim is

1. An explosive gas engine, provided with means for supplying air under pressure, and means for supplying liquid fuel, a mixing chamber for the air and the liquid fuel, means for accelerating the velocity and increasing the temperature of the air in transit to said mixing chamber, a liquid fuel supply discharge exposed to the current of air, and means for controlling the supply of the oil and the air.

2. An explosive gas engine provided with means for supplying air under pressure, and means for supplying oil, a mixing chamber for the air and the oil provided with means for accelerating the velocity and increasing the temperature of the air in transit, an oil supply discharge operated upon by the current of air, and means for controlling the supply of the air and the oil.

3. An explosive gas engine provided with means for supplying air under pressure, a mixing chamber, means for forming a contracted passage for the air, an oil and air distributer adjacent to said passage and operated upon by the current of air, and means for controlling the supply of the air and the oil.

4. An explosive gas engine provided with means for supplying air under pressure, a mixing chamber, an obstruction concentrically arranged to form an annular passage for the air, a distributer adjacent to said passage and provided with oil and air passages, and means for controlling the supply of the air and the oil.

5. An explosive gas engine provided with means for supplying air under pressure, a mixing chamber, a distributer concentrically arranged in said chamber and provided with liquid fuel and air ducts or passages in parallel planes.

6. An explosive gas engine provided with means for supplying air under pressure and means for supplying liquid fuel, a mixing chamber, an ejector concentrically arranged in said chamber for distributing liquid fuel and air, and means for controlling the supply of the air and the liquid fuel.

7. An explosive gas engine provided with means for supplying air under pressure, a mixing chamber, a distributer in said chamber provided with liquid fuel and air ducts, and a cap at its discharge end having a chamber to which the air is supplied and from which it issues with the liquid fuel.

In testimony whereof we affix our signatures in presence of two witnesses.

JOHN S. LOSCH.
GEORGE H. GERBER.

Witnesses:
D. C. REINOHL,
W. PARKER REINOHL.